United States Patent Office 3,325,479
Patented June 13, 1967

3,325,479
DERIVATIVES OF AMINOACYLPENICILLINS AND A PROCESS FOR THEIR PREPARATION
George Robert Fosker, Horsham, Sussex, John Herbert Charles Nayler, Dorking, Surrey, and John Alan Wilcox, Betchworth, Surrey, England, assignors to Beecham Group Limited, Brentford, England, a British company
No Drawing. Filed Feb. 24, 1964, Ser. No. 347,031
Claims priority, application Great Britain, Feb. 28, 1963, 8,176/63
9 Claims. (Cl. 260—239.1)

This invention relates to novel penicillins and more particularly to aminoacylpenicillins.

The penicillins of the present invention are of value as antibacterial agents, as nutritional supplements in animal feeds, as agents for the treatment of mastitis in cattle and as therapeutic agents in poultry and animals, including man, in the treatment especially of infectious diseases caused by Gram-positive and Gram-negative bacteria.

The present invention provides a process for the preparation of penicillins of the formula:

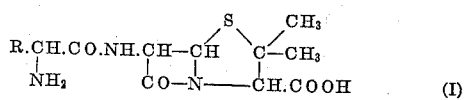

and non-toxic salts thereof, wherein R is a substituted or unsubstituted alkyl, aralkyl, aryl or heterocyclic group, which process comprises hydrolysing a N-protected penicillin of the formula:

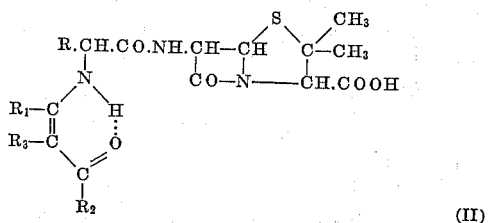

wherein $R_1$ is an alkyl, aralkyl or aryl group, $R_2$ is an alkyl, aralkyl, aryl, alkoxy, aralkoxy or aryloxy group and $R_3$ is a hydrogen atom or an alkyl, aralky or aryl group, or $R_3$ together with either $R_1$ or $R_2$ completes a carbocyclic ring, and non-toxic salts thereof.

The salts are non-toxic salts including non-toxic metallic salts such as sodium, potassium, calcium and aluminium, the ammonium salt and substituted ammonium salts, e.g. salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, and other amines which have been used to form salts with benzylpenicillin.

The N-protected penicillins (II) are prepared by reacting 6-aminopenicillanic acid or a salt thereof in aqueous or anhydrous media with a reactive derivative of a carboxylic acid of the general formula:

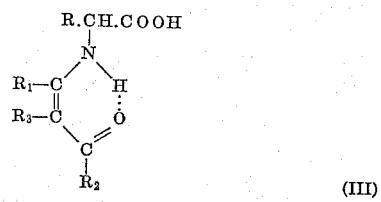

where R, $R_1$, $R_2$ and $R_3$ are as hereinbefore defined.

Examples of suitable reactive derivatives are mixed anhydrides (including those obtained by treating a salt of the acid in anhydrous medium with an alkyl chlorocarbonate) and the intermediates formed by reaction with a carbodi-imide, e.g. NN' - dicyclohexylcarbodi-imide, or with carbonyldiimidazole.

In a preferred form of the invention the N-protected penicillins (II) are not isolated but are hydrolysed directly in situ.

The hydrolysis may be carried out in aqueous or partly aqueous solution, preferably between pH 1 and pH 5 and at ambient temperature.

In one method of carrying out the present invention the hydrolysis is effected by adding a small quantity of an aqueous solution of a mineral acid or strong organic acid to a solution of an amine salt of the N-protected penicillin in an organic solvent or mixture of solvents.

An alternative method of carrying out the present invention is to treat an alkali metal salt of the N-protected penicillin with an aqueous acid solution, e.g. dilute acetic acid or very dilute hydrochloric acid.

The completion of hydrolysis is indicated by the disappearance of the starting N-protected penicillin, as shown by paper chromatography, the desired penicillin (I) being isolated and purified by any one of the conventional procedures used for aminopenicillins.

The acids (III) are probably tautomeric substances, and may be represented either as (IIIa) or as (IIIb); similar considerations applying to the derived penicillins (II). For the sake of simplicity and consistency all these compounds are herein named in accordance with structures (II) and (IIIa). The dotted lines in the formulae (II), (IIIa) and (IIIb) represent hydrogen bonds.

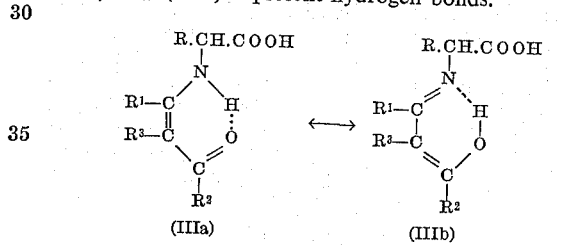

The acids (III) in the form of their salts are conveniently prepared by condensing an α-amino acid (IV) or a salt thereof with a β-diketone or β-ketoester (V), one method of effecting such a condensation being that described by Dane et al. (Angew. Chem., 1962, 74, 873). Either optical isomer of the amino acid (IV), or the racemic mixture, may be employed.

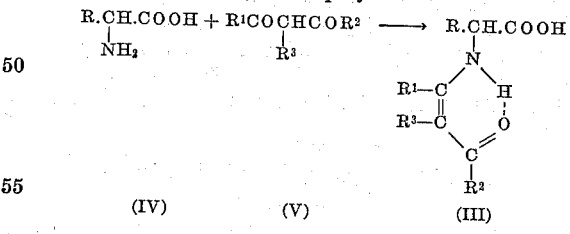

Enhanced yields of the final penicillins can be obtained by the hydrolysis of solutions of the N-protected penicillins obtained by reacting 6-aminopenicillanic acid or a salt thereof with a mixed anhydride prepared by a reaction involving the use of an alkali metal salt of the carboxylic acid (III) in the presence of a small quantity of a catalyst.

The preferred catalyst have the general formula:

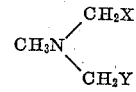

where X is a hydrogen atom or an alkyl, substituted alkyl, phenyl, substituted phenyl or carboxyl group, Y is a hydrogen atom or a lower alkyl group, or X and Y together represent any one of the divalent radicals, ethylene, substituted ethylene, trimethylene, substituted trimethylene, —$CH_2OCH_2$— or —$CH_2N(CH_3)CH_2$—. Examples of such catalysts are N-methylmorpholine and N,N-dimethylbenzylamine.

Preferably the mixed anhydride is prepared in an inert water-miscible solvent, such as dry acetone, and is then allowed to react with an aqueous solution of a salt of 6-aminopenicillanic acid, e.g. an alkali metal salt or a salt with a tertiary amine such as triethylamine. After removal of the organic solvent the N-protected penicillin remains in the aqueous solution and is hydrolysed directly to the free aminoacylpenicillin by means of mineral acid. The liberated N-protecting agent is removed by solvent extraction, then the pH of the aqueous phase is raised so that the aminopenicillin crystallises.

The separation of the aminopenicillin from the β-diketone or β-ketoester formed during the reaction may be effected by taking advantage of the solubility of such by-products in solvents, e.g. ether, chloroform or benzene, which do not dissolve the aminopenicillin.

The present invention is particularly applicable to the preparation of α-aminobenzylpenicillin; this penicillin and the other penicillins of this invention may exist in epimeric forms and it will be understood that the invention includes such forms.

The following examples illustrate the present invention:

EXAMPLE 1

*Sodium N-(1-acetylpropen-2-yl)-α-aminophenylacetate*

A suspension of sodium D(—)-α-aminophenylacetate (6.9 g.) in ethanol (200 ml.) was treated with acetylacetone (4.2 ml.) and refluxed for 3 hours. The almost clear pale yellow solution was filtered, evaporated to dryness under reduced pressure, and the residue dried over phosphorus pentoxide in vacuo to leave sodium N-(1-acetylpropen-2-yl) - α - aminophenylacetate (10 g.). After recrystallisation from light petroleum, a specimen had a decomposition range of 115–121°. (Found: C, 61.1; H, 6.1; N, 5.5; Na, 8.7. $C_{13}H_{14}N\ NaO_3$ requires C, 61.1; H, 5.5; N, 5.5; Na, 9.0%.)

EXAMPLE 2

*Sodium N-(1-methoxycarbonylpropen-2-yl)-α-aminophenylacetate*

A suspension of sodium D(—)-α-aminophenylacetate (17.3. g.) in ethanol (300 ml.) was treated with methyl acetoacetate (10.8 ml.) and refluxed for 2 hours to give a clear colourless solution. Crystals of sodium N-(1-methoxycarbonylpropen - 2 - yl)-α-aminophenylacetate (11.3 g., M.P. 244–248°) separated on cooling, and a further crop (14.4 g.) was obtained by evaporating the filtrate. (Found: C, 57.3; H, 5.4; N, 4.9; Na, 8.1. $C_{13}H_{14}NNaO_4$ requires C, 57.5; H, 5.2; N, 5.2; Na, 8.5%.)

EXAMPLE 3

*Sodium N-(1-acetylpropen-2-yl)-α-amino-γ-methylthiobutyrate*

The sodium salt of DL-methionine (1.7 g.) was suspended in ethanol (25 ml.), treated with acetylacetone (1 ml.), and the mixture was refluxed for 2 hours and then worked up as described in Example 1 to yield sodium N-(1-acetylpropen - 2 - yl)-α-amino-γ-methylthiobutyrate (2.5 g.), M.P. 165–170°. (Found: C, 47.8; H, 6.6; N, 5.5; Na, 8.9; S, 12.2. $C_{10}H_{16}NNaO_3S$ requires C, 47.4; H, 6.4; N, 5.5; Na, 9.1; S, 12.7%.)

EXAMPLE 4

*Sodium N-(1-methoxycarbonylpropen-2-yl)-α-amino-γ-methylthiobutyrate*

This salt (2.4 g., M.P. 90–95°) was prepared as described in Example 3 except that methyl aceto-acetate (1.1 ml.) was used instead of acetylacetone.

EXAMPLE 5

*N-(1-acetylpropen-2-yl)α-aminobenzylpenicillin*

(A) TRIETHYLAMINE SALTS

A solution of sodium N-(1-acetylpropen-2-yl)-α-aminophenylacetate 2.56 g., prepared according to Example 1, in dry methylene dichloride (25 ml.) was chilled to —5° and treated with ethyl chlorocarbonate (0.96 ml.) followed, after 5 minutes, by one drop of pyridine. The mixture was stirred at 0° for 15 minutes and the resulting suspension then added to an ice-cold solution of 6-aminopenicillanic acid (2.16 g.) and triethylamine (0.5 ml.) in methylene dichloride (50 ml.). The mixture was stirred at 0° for 3 hours, filtered, and the filtrate evaporated under reduced pressure. Treatment of the residue with dry ether gave a pale yellow solid, which was collected and dried over phosphorus pentoxide in vacuo to give 4.0 g. of the triethylamine salt of the penicillin, estimated by colorimetric assay with hydroxylamine to be 60% pure.

(B) SODIUM SALT

A solution of sodium N-(1-acetylpropen-2-yl)-α-aminophenylacetate (2.5 g.) in dry acetone (25 ml.) was chilled to —5° and treated with ethyl chlorocarbonate (0.95 ml.) followed, after 5 minutes, by one drop of pyridine. The mixture was stirred at 0° for 15 minutes, then cooled to —45° and added as rapidly as possible to a vigorously stirred ice-cold solution of 6-aminopenicillanic acid (2.15 g.) in 3% aqueous sodium bicarbonate (28 ml.), the temperature of the mixture never being allowed to rise above 0°. The resulting yellow solution was stirred for 30 minutes at 0°, and then for a further 30 minutes without external cooling. Evaporation at low temperature and pressure, followed by drying over phosphorus pentoxide in vacuo, left 4.0 g. of the sodium salt of the penicillin which was estimated by colorimetric assay with hydroxylamine to be 75% pure.

EXAMPLE 6

*N-(1-methoxycarbonylpropen-2-yl)-α-aminobenzylpenicillin, triethylamine salt*

A suspension of sodium N-(1-methoxycarbonylpropen-2-yl)-α-aminophenylacetate 2.7 g., prepared as described in Example 2, in dry methylene dichloride (25 ml.) was converted into a mixed anhydride and coupled with 6-aminopenicillanic acid (2.16 g.) by the procedure of Example 5(A). The resulting triethylamine salt of penicillin (4.2 g.) was estimated by colorimetric assay with hydroxylamine to be 59% pure.

EXAMPLE 7

*N-(1-acetylpropen-2-yl)-α-amino-γ-methylthiopropylpenicillin*

(A) TRIETHYLAMINE SALT

A suspension of sodium N - (1-acetylpropen-2-yl)-α-amino-γ-methylthiobutyrate 2.5 g., prepared according to Example 3, in dry methylene dichloride (25 ml.) was converted into a mixed anhydride and coupled with 6-aminopenicillanic acid (2.16 g.) by the procedure of Example 5(A). The resulting triethylamine salt of the penicillin (3.9 g.) was estimated by colorimetric assay with hydroxylamine to be 53% pure.

(B) SODIUM SALT

A solution of sodium N-(1-acetylpropen-2-yl)-α-amino-γ-methylthiobutyrate (2.5 g.) in dry acetone (25 ml.) was converted into a mixed anhydride and coupled with 6-aminopenicillanic acid (2.16 g.) by the procedure of Example 5(B). The resulting sodium salt of the penicillin (4.2 g.) was estimated by colorimetric assay with hydroxylamine to be 57% pure.

EXAMPLE 8

N-(1-methoxycarbonylpropen-2-yl)-α-amino-γ-methylthiopropylpenicillin, triethylamine salt Reaction of sodium N-(1-methoxycarbonylpropen-2-yl)-α-amino-γ-methylthiobutyrate 2.7 g., prepared according to Example 4 with 6-aminopenicillanic acid via the mixed anhydride as described in Example 5(A) gave the crude triethylamine salt of the penicillin as a gummy solid which exhibited antibacterial activity against B. subtilis.

EXAMPLE 9

Condensation of various ring-substituted DL-α-amino phenylacetic acids with methyl acetoacetate Sodium salts of the appropriate amino-acids were condensed with methyl acetoacetate by the procedure of Example 2 to give the following ring-substituted sodium N-(1 - methoxycarbonylpropen - 2 - yl)-α-aminophenylacetates, some of which were solvated:

| Substitution in benzene ring: | M.P. (decomp.), ° |
|---|---|
| o-Fluoro | 147–149 |
| m-Fluoro | Indefinite |
| p-Fluoro | 152–153 |
| o-Chloro | 160–165 |
| m-Chloro | 170–171 |
| p-Chloro | 164–165 |
| 3,4-dichloro | 165–167 |
| m-Nitro | 205–207 |
| m-Hydroxy | 198–200 |

EXAMPLE 10

Condensation of D(−)-α-aminophenylacetic acid with various carbonyl compounds Alkali metal salts of D(−) α-aminophenylacetic acid were suspended in a lower alkanol and condensed with the appropriate carbonyl compound essentially as in Example 1. Melting points of the resulting N-protected amino-acid salts, some of which were solvated, are tabulated below:

| Carbonyl component | Metal ion | Reaction solvent | M.p. (decomp.) (deg.) |
|---|---|---|---|
| Ethyl acetoacetate | Na | EtOH | 255–262 |
| Do | K | EtOH | 234–236 |
| Ethyl α-methylacetoacetate | Na | EtOH | 233–237 |
| Ethyl 2-cyclohexanonecarboxylate | Na | EtOH | 268–269 |
| Ethyl 2-cyclopentanonecarboxylate | K | EtOH | 243–245 |
| Diethyl acetonedicarboxylate | Na | EtOH | 80–95 |
| Benzoyl acetone | K | MeOH | 190–192 |
| 2-acetylcyclohexanone | Na | EtOH | 96–102 |

EXAMPLE 11

α-Aminobenzylpenicillin (a) The triethylamine salt of N-(1-acetylpropen-2-yl)-α-aminobenzylpenicillin (0.38 g., prepared as in Example 5) was dissolved in a mixture of chloroform (20 ml.) and acetone (25 ml.), treated with 2 N hydrochloric acid (0.4 ml.) and stirred for 90 minutes. The mixture was then thoroughly extracted with water (35 ml.) and the layers were separated. The yellowish aqueous phase was washed with an equal volume of ether, then adjusted to pH 7 with sodium bicarbonate solution and evaporated at low temperature and pressure. The residue was finally dried over phosphorus pentoxide in vacuo to give 0.2 g. of α-aminobenzylpenicillin, which was estimated by colorimetric assay with hydroxylamine to be 23% pure.

(b) The triethylamine salt of N-(1-methoxycarbonylpropen-2-yl)-α-aminobenzylpenicillin (0.55 g., prepared as in Example 6) was dissolved in a mixture of chloroform (25 ml.) and acetone (20 ml.) stirred for 90 minutes with 2 N hydrochloric acid (0.5 ml.) and the mixture worked up as before to give 0.35 g. of α-aminobenzylpenicillin. Hydroxylamine assay indicated a purity of 40%.

(c) Each of the N-protected α-aminophenylacetic acid salts described in Example 10 was suspended or dissolved in methylene chloride, converted into the mixed ethoxyformic anhydride at −5°, and coupled with 6-aminopenicillanic acid by the general procedure of Example 5(A). The resulting N-protected penicillin was dissolved in acetone and hydrolysed at room temperature with two equivalents of 0.3 N hydrochloric acid for 2 hours. The mixture was then diluted with methylene chloride and the aqueous layer was separated, adjusted to pH 5, and evaporated to dryness at low temperature and pressure. In each case the product was identified as α-aminobenzylpenicillin by paper chromatography. The purity of the various specimens as determined by colorimetric assay with hydroxylamine ranged from 25 to 79%.

EXAMPLE 12

α-Amino-γ-methylthiopropylpenicillin (a) The triethylamine salt of N-(1-methoxycarbonylpropen - 2 - yl)-2-amino-γ-methylthiopropylpenicillin described in Example 8 was dissolved in a mixture of chloroform (40 ml.) and acetone (40 ml.), stirred for 1 hour with 2 N hydrochloric acid (5.2 ml.) and the mixture worked up as in Example 11(A) to give 2.6 g. of α-amino-γ-methylthiopropylpenicillin. Hydroxylamine assay indicated a purity of 25%. Paper chromatography revealed only one zone of antibiotic activity, which was not due to the starting penicillin.

(b) The sodium salt of N-(1-acetylpropen-2-yl)-α-amino-γ-methylthiopropylpenicillin (0.45 g.) prepared as in Example 7(B) was dissolved in water (25 ml.), treated with 2 N hydrochloric acid (0.5 ml.), and stirred for 90 minutes. The colourless solution was then extracted with ether (25 ml.) and the extracts were discarded. The aqueous phase was brought to pH 7 by addition of sodium bicarbonate solution, then evaporated at low temperature and pressure. The residue was finally dried in vacuo over phosphorus pentoxide to give 0.4 g. of α-amino-γ-methylthiopropylpenicillin, which was estimated by colorimetric assay with hydroxylamine to be 48% pure.

EXAMPLE 13

Various ring-substituted α-aminobenzylpenicillins

Each of the ring-substituted sodium N-(1-methoxycarbonylpropen-2-yl)-α-aminophenylacetates described in Example 9 was suspended in methylene chloride, converted into the mixed ethoxyformic anhydride, and coupled with 6-aminopenicillanic acid by the general procedure of Example 5(A). The resulting N-protected penicillins in acetone were treated at room temperature for 30 minutes to 2 hours with one equivalent of dilute hydrochloric acid. Evaporation of the solutions at low temperature and pressure, followed by trituration of the residues with methylene chloride, gave the crude solid α-aminopenicillins. Formation of these new penicillins was confirmed by paper chromatography. The purity of the various products as determined by colorimetric assay with hydroxylamine was as follows:

| Substitution in benzene ring | N-protected penicillin, percent | Free α-amino penicillin, percent |
|---|---|---|
| o-Fluoro | 68 | 48 |
| m-Fluoro | 65 | 46 |
| p-Fluoro | 68 | 47 |
| o-Chloro | | 50 |
| p-Chloro | | 59 |
| 3,4-dichloro | 66 | 47 |
| m-Nitro | | 61 |

EXAMPLE 14

*Crystalline 6-[D(—) α-aminophenylacetamido]-penicillanic acid*

(a) Ethyl chlorocarbonate (10.5 ml.) in dry acetone (350 ml.) was cooled to —8° and treated with N-methylmorpholine (4 drops). The mixture was stirred at —8° to —5° while sodium N-(1-methoxycarbonylpropen-1-yl) (D—) α-aminophenylacetate (30 g.) was added during 2 minutes, then for 20 minutes longer. The resulting mixture contained the reactive mixed anhydride in solution and sodium chloride in suspension.

Meanwhile a solution (pH 8) was prepared from 6-aminopenicillanic acid (25 g.), water (150 ml.) and triethylamine (17–18 ml.), diluted with acetone (150 ml.) and cooled to —8° to —5°. The mixed anhydride reagent was then added, with vigorous stirring, during 5 minutes and the mixture was stirred for 1 hour more.

The mixture was concentrated at low temperature and pressure to remove acetone, then covered with methyl isobutyl ketone (250 ml.). Concentrated hydrochloric acid was added with vigorous stirring to bring the aqueous phase to pH 2 and stirring was continued for 15 minutes, adding more acid if necessary. The layers were separated and the stirred aqueous solution was adjusted to pH 6–6.4 by cautious addition of 10% sodium hydroxide solution. Crystallisation soon commenced and the mixture was set aside overnight in the refrigerator.

Next morning the product was collected, washed with two 10 ml. portions of water, and dried in air at 40° to give hydrated 6-[D(—) α-aminophenylacetamido]-penicillanic acid. The products of several such reactions contained 80–85% of the pure anhydrous penicillin as indicated by alkalimetric and microbiological assay. Weight yields were 33–36 g., corresponding to activity yields of 66–72%.

A representative sample had $[\alpha]_D^{21} = +240°$ (C., 0.32 in $H_2O$) and analysed as follows:

Found: C, 47.3; H, 6.4; N, 10.2; S, 7.4; $H_2O$ 13.3. $C_{16}H_{19}N_3O_4S$, $3H_2O$ requires C, 47.6; H, 6.3; N, 10.4; S, 7.9; $H_2O$, 13.4%.

(b) The above experiment was repeated except that the condensation product from sodium D(—) α-aminophenylacetate and diethyl acetonedicarboxylate (described in Example 10) was used instead of the equivalent amount of sodium N(1-methoxycarbonylpropen-2-yl) D(—) α-aminophenylacetate. The crystalline hydrated product was obtained in 42% yield and was estimated to contain 81% of the pure anhydrous penicillin.

(c) A suspension of sodium N(1-methoxycarbonylpropen-2-yl) α-aminophenylacetate (135.5 g., 0.5 mole) in acetone (1750 ml.) was cooled to —20° and stirred vigorously while ethyl chlorocarbonate (54.5 g., 0.5 mole) and a solution of N,N-dimethylbenzylamine in acetone (12.5 ml. of 1%) were added. Stirring was continued at —20° for 25 minutes, then a pre-cooled solution prepared from 6-aminopenicillanic acid (108 g., 0.5 mole), water (250 ml.), sufficient N sodium hydroxide to bring the mixture to pH 7, and acetone (750 ml.) was added. The mixture was stirred for 30 minutes while the temperature rose from —15° to 0°, then acetone was removed at low temperature and pressure to leave about 500 ml. of aqueous concentrate.

Methyl isobutyl ketone (1250 ml.) and 100% formic acid (192.5 ml.) were added, and the mixture was stirred vigorously for 1 hour, then allowed to stand at 0–5° for 16 hours. The penicillin was finally collected by filtration, washed with water (2×50 ml.), and dried at 35–40°. Yield 136 g., purity 87%, water content 12.5%.

(d) The experiments described under (a) or (c) were repeated except that corresponding quantities of the catalysts shown in the following table were used instead of N-methylmorpholine or N,N-dimethylbenylamine:

| Catalyst | Isolated yield (corrected for purity) Percent |
|---|---|
| N-methylpiperidine | 63 |
| N-methylpiperidine methiodide | 31 |
| 2-hydroxymethyl-N-methyl-pyrrolidine | 46 |
| 2-dimethylaminoethanol | 59 |
| 3-dimethylaminopropan-1-ol | 67 |
| 1-dimethylaminopropan-2-ol | 60 |
| 2-dimethylaminoethyl chloride hydrochloride | 61 |
| Dimethylaminoacetic acid hydrochloride | 57 |
| N,N-dimethylmyristylamine oxide | 55 |

Other catalysts which gave good results included trimethylamine hydrochloride, N,N-dimethylmyristylamine, N-methylpyrrolidine, and N,N-dimethylpiperazine. Variable results were obtained with pyridine, piperidine, pyrrolidine, and morpholine. A commercial sample of N-methylpyrrolidone (presumably containing a basic impurity) was also effective, but the purified compound was not.

EXAMPLE 15

*α-Amino-m-hydroxybenzylpenicillin*

Ethyl chlorocarbonate (2.0 ml.) in dry acetone (30 ml.) was cooled to —5° and treated with N-methylmorpholine (2 drops). The mixture was stirred at —5° to 0° while sodium N-(1-methoxycarbonylpropen-2-yl) DL-α-amino-m-hydroxyphenylacetate (5.8 g., prepared as described in Example 9) was added portionwise during 2 mins., then for 15 mins. more. The mixture was filtered and the filtrate added with stirring to an ice-cold solution of 6-aminopenicillanic acid (4.2 g.) in water (15 ml.) triethylamine (2.95 ml.) and acetone (15 ml.). The resulting solution was stirred for 30 minutes at 0°, then for 30 minutes without external cooling, and finally concentrated at low temperature and pressure to a volume of 20 ml.

The residual aqueous solution was covered with ether (20 ml.), adjusted to pH 1.5 by careful addition of concentrated hydrochloric acid, and stirred for 15 minutes. The layers were then separated and the aqueous phase was extracted with a further 10 ml. of ether. Finally, the aqueous phase was cautiously treated with 5 N sodium hydroxide to bring the pH to 5.7, whereupon crystallisation occurred. The mixture was kept at 0° for 1 hour, then the product was collected, washed with cold water, and dried over phosphorus pentoxide in vacuo to yield 2.0 g. of α-amino-m-hydroxybenzylpenicillin monohydrate. (Found: N, 11.1; S, 8.0. $C_{16}H_{19}N_3O_5S$, $H_2O$ requires N, 11.0; S, 8.3%.)

EXAMPLE 16

*α-Amino-2-thienylmethylpenicillin*

A suspension of potassium DL-α-amino-2-thienylacetate (2.4 g.) in ethanol (20 ml.) was treated with ethyl acetoacetate (1.6 ml.) and refluxed for 15 minutes, to give a clear solution. The solvent was removed under reduced pressure and the residue dried over phosphorus pentoxide in vacuo to give potassium N(1-ethoxycarbonylpropen-2-yl) α-amino-2-thienylacetate (3.5 g., indefinite melting point). (Found: C, 46.7; H, 5.4; K, 12.9; N, 4.4; S, 10.4. $C_{12}H_{14}KNO_4S$ requires C, 46.9; H, 4.6; K, 12.7; N, 4.6; S, 10.4%.)

This intermediate (1.5 g.) was added portionwise to a stirred solution of ethyl chlorocarbonate (0.5 ml.) and N-methylmorpholine (1 drop) in dry acetone (20 ml.) at —5°. The suspension was stirred for a further 15 minutes at —5° to 0° and then filtered. The filtrate was added to a stirred ice-cold solution prepared from 6-aminopenicillanic acid (1 g.), water (10 ml.), triethylamine (0.7 ml.), and acetone (10 ml.). The mixture was stirred for 30 minutes at 0°, then for a further 30 minutes while it attained room temperature, and concentrated in vacuo to remove the acetone.

The aqueous concentrate was covered with an equal volume of ether, adjusted to pH 1.5, with hydrochloric acid, and stirred for 15 minutes. The layers were separated and the aqueous phase was brought back to pH 6 with dilute sodium hydroxide, then evaporated to dryness at low temperature and pressure. The residue was dried over phosphorus pentoxide, thoroughly washed with methylene dichloride, and again, dried to give crude α-amino-2-thienylmethylpenicillin (1.5 g.). Alkalimetric assay of this product indicated a purity of 44%. When subjected to paper chromatography it gave a single zone of antibacterial activity.

α-Amino-3-thienylmethylpenicillin could be prepared in similar fashion from potassium α-amino-3-thienylacetate.

We claim:
1. A compound selected from the group consisting of a compound of the formula:

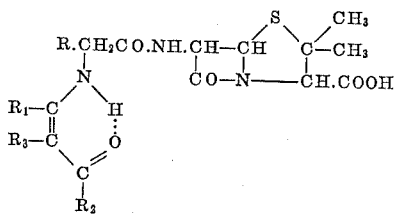

wherein R is alkyl, phenyl, phenyl substituted with fluorine, chlorine, nitro and hydroxy, or thienylmethyl, $R_1$ is alkyl, $R_2$ is alkyl, phenyl or alkoxy, and $R_3$ is hydrogen or alkyl, and its sodium, potassium, calcium, aluminum and ammonium salts, and its non-toxic substituted ammonium salts with an amine selected from the group consisting of a tri(lower)alkylamine, procaine, dibenzylamine, N-benzyl-beta-phenethylamine, 1-ephenamine, N,N'-bis-dehydroabietylethylenediamine, N,N'-dibenzylethylenediamine and dehydroabietylamine.

2. A compound selected from the group consisting of a compound of the formula:

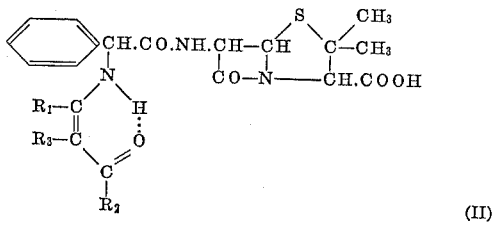

wherein $R_1$ is alkyl, $R_2$ is alkyl, phenyl or alkoxy and $R_3$ is hydrogen or alkyl, and its sodium, potassium, calcium, aluminum and ammonium salts, and its non-toxic substituted ammonium salts with an amine selected from the group consisting of a tri(lower)alkylamine, procaine, dibenzylamine, N-benzyl-beta-phenethylamine, 1-ephenamine, N,N'-bis-dehydroabietylethylenediamine, N,N'-dibenzylethylenediamine and dehydroabietylamine.

3. A compound selected from the group consisting of a compound of the formula:

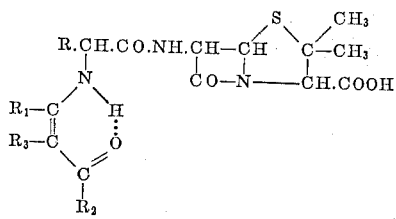

wherein R is alkyl, phenyl, phenyl substituted with fluorine, chlorine, nitro and hydroxy, or thienylmethyl, $R_2$ is alkyl, phenyl or alkoxy and $R_1$ and $R_3$ together are a saturated divalent radical completing a 5- or 6-membered ring, and its sodium, potassium, calcium, aluminum, and ammonium salts and its non-toxic substituted ammonium salts with an amine selected from the group consisting of a tri(lower)alkylamine, procaine, dibenzylamine, N-benzyl-beta-phenethylamine, 1-ephenamine, N,N'-bis-dehydroabietylethylenediamine, N,N'-dibenzylethylenediamine and dehydroabietylamine.

4. N-(1-acetylpropen-2-yl)-α-aminobenzylpenicillin.

5. The sodium salt of N-(1-acetylpropen-2-yl)-α-aminobenzylpenicillin.

6. N - (1 - methoxycarbonylpropen - 2 - yl) - α - aminobenzylpenicillin.

7. The sodium salt of N-(1-methoxycarbonylpropen-2-yl)-α-aminobenzylpenicillin.

8. The triethylamine salt of N-(1-acetylpropen-2-yl)-α-aminobenzylpenicillin.

9. The triethylamine salt of N-(1-methoxycarbonylpropen-2-yl)-α-aminobenzylpenicillin.

No references cited.

NICHOLAS S. RIZZO, *Primary Examiner.*

HENRY R. JILES, ALEX MAZEL, *Examiners.*

J. W. ADAMS, *Assistant Examiner.*